(12) United States Patent
Parkes

(10) Patent No.: US 6,359,188 B1
(45) Date of Patent: Mar. 19, 2002

(54) METHOD AND APPARATUS FOR ROCKET MOTOR DISPOSAL

(76) Inventor: John Humphries Parkes, Redhall Mill, Colinton Dell Edinburgh EH14 1JF (GB)

( * ) Notice: Subject to any disclaimer, the term of this patent is extended or adjusted under 35 U.S.C. 154(b) by 0 days.

(21) Appl. No.: 09/392,925

(22) Filed: Sep. 9, 1999

(30) Foreign Application Priority Data

Sep. 24, 1998 (GB) ............................................. 9820720
Jun. 22, 1999 (GB) ............................................. 9914598

(51) Int. Cl.⁷ ................................................. A62D 3/00
(52) U.S. Cl. ...................................... 588/202; 588/203
(58) Field of Search ................................. 588/202, 203

(56) References Cited

FOREIGN PATENT DOCUMENTS

| GB | 2 306 884 A | 11/1996 |
|---|---|---|
| RU | 2021560 | 10/1994 |
| RU | 2045675 | 10/1995 |

OTHER PUBLICATIONS

Search Report under Section 17 of Patents Act of 1977 re Application No. GB 9914598.9.

*Primary Examiner*—Steven P. Griffin
*Assistant Examiner*—Eileen E. Nave
(74) *Attorney, Agent, or Firm*—William N. Hogg

(57) ABSTRACT

A method of disposing of a rocket motor 12 comprises burning propellant contained within the motor and generating an enclosure 13 of liquid within which the burning occurs. Apparatus for carrying out the method comprises a nozzle/clamping unit 1 for securing the rocket motor 12 in place and generating the liquid enclosure 13. The liquid, which may be water and may include neutralising chemicals, is filtered and recycled.

12 Claims, 3 Drawing Sheets

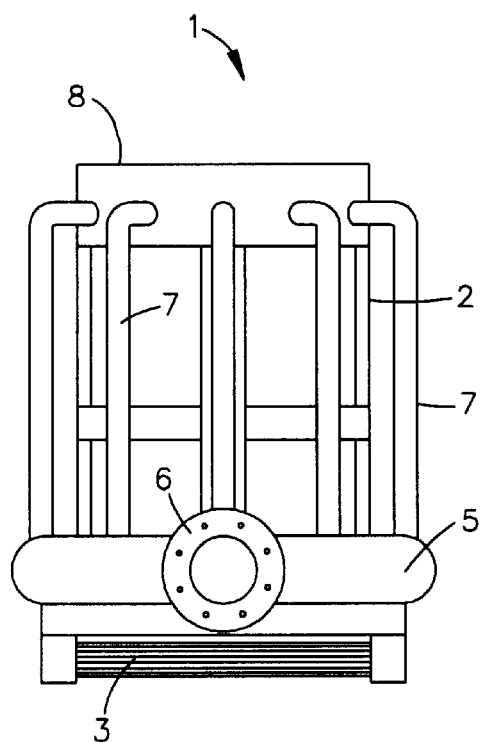
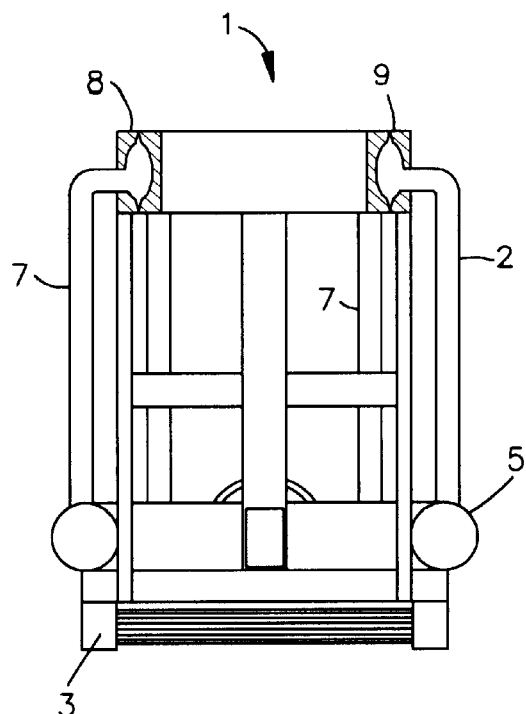
Fig.1
Fig.3
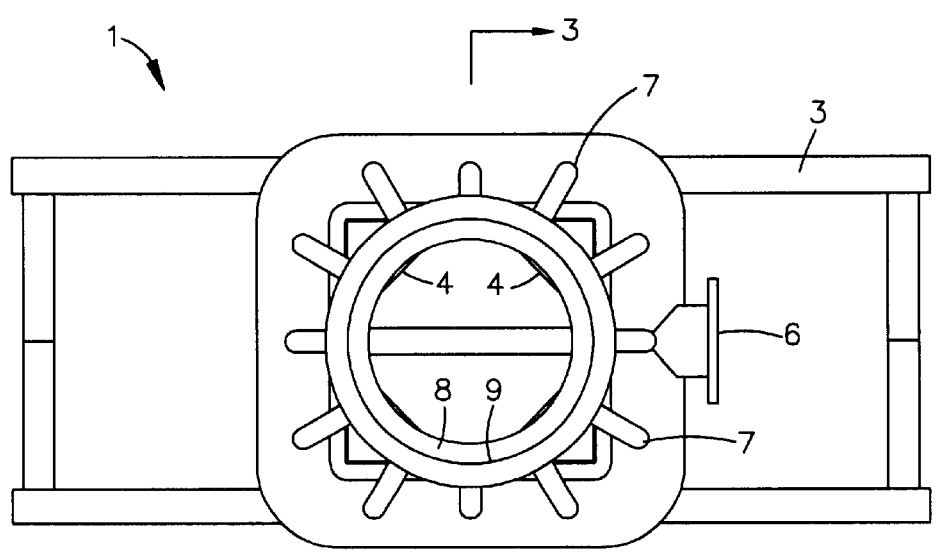
Fig.2

METHOD AND APPARATUS FOR ROCKET MOTOR DISPOSAL

FIELD OF THE INVENTION

The present invention relates to a method and apparatus for rocket motor disposal.

BACKGROUND OF THE INVENTION

Large numbers of redundant munitions comprising rocket motors exist and environmentally friendly methods for their disposal are sought.

British Patent Application No. 2306884 describes a method of limiting the environmental disturbance of an exploding munition, such as a bomb, by spraying a liquid towards the munition to create a liquid dispersion which at least partly surrounds the munition and detonating the munition into the dispersion. That method is suitable for disposing of bombs, but may be unsuitable for disposing of certain rocket motors, despite the fact that these can be detonated or deflagrated without becoming propulsive.

SUMMARY OF THE INVENTION

It is an aim of the present invention to provide a safe, environmentally friendly and adaptable open burning method and apparatus for disposing of rocket motors.

According to one aspect of the invention, there is provided a method for disposing of a rocket motor comprising burning propellant contained within the motor, and generating an enclosure of liquid within which the burning occurs. The enclosure or shroud of liquid captures particulate matter from the rocket motor's emissions.

In an embodiment of the invention, the liquid, which may comprise water, includes at least one neutralising chemical for neutralising noxious substances resulting from the burning and/or for capturing hazardous materials, such as asbestos.

Preferably, prior to the burning step, demilitarization or reverse engineering operations are carried out on a rocket-propelled munition of which the rocket motor forms a part. Such operations may comprise removal of a warhead, removal of an ancillary propulsion system and removal of a venturi mechanism. The best results are achieved when the motor is secured in a substantially vertical position, with its rear or exhaust end facing upwards, during the burning step. The method may comprise further steps of filtering liquid from said enclosure and recycling the filtered liquid to the enclosure.

According to another aspect of the invention, there is provided apparatus for disposing of a rocket motor, comprising means for generating an enclosure of liquid within which propellant contained within the motor can be burnt. Preferably, the liquid enclosure generating means comprises a nozzle having an outlet in the form of a closed figure, such as a circle. The apparatus preferably comprises means for securing the rocket motor in place. In a particular embodiment, the securing means and the liquid enclosure generating means are integral parts of the same unit. The apparatus preferably includes a pump for conveying liquid to the enclosure generating means. Filtering means for filtering liquid from the enclosure may also be included, as may a submersible pump for returning the liquid to a reservoir from which it may once again be conveyed to the enclosure generating means. Deflecting means, such as a hood and a conduit of large diameter, may optionally be provided for directing the exhaust plume and aerosoled liquid to a non-damaging location.

BRIEF DESCRIPTION OF THE DRAWINGS

The present invention will now be described in more detail, by way of example only, with reference to the accompanying drawings, in which:

FIG. 1 is an elevation of a nozzle/securing unit according to an embodiment of the invention;

FIG. 2 is a plan of the unit shown in FIG. 1;

FIG. 3 is a vertical section of the unit shown in FIGS. 1 and 2, taken along the line III—III in FIG. 2;

DETAILED DESCRIPTION OF THE INVENTION

FIGS. 1 to 4 show a unit 1 for securing a rocket motor and generating a liquid enclosure around burning propellant from the motor. The unit 1 comprises a frame 2 mounted on an open rectangular base 3. Adjustable clamps 4 provided on the frame 2 can be tightened to secure a rocket motor in place in the unit 1 with the rear or exhaust end of the motor facing upwards.

Figure 4:
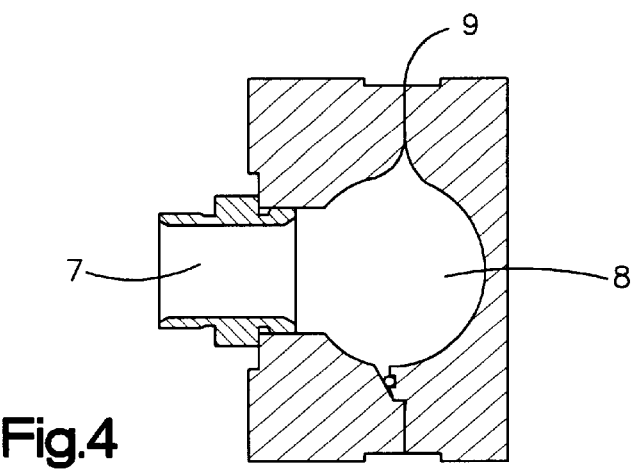
FIG. 4 shows a detail of the second shown in FIG. 3.

A pipe 5 mounted in a square around the bottom of the frame 2 has an inlet 6 to which a high-pressure pipeline can be fitted in a liquid-tight manner. A number (eight in this example) of vertical pipes 7 lead from the annular pipe 5 to an annular nozzle 8 mounted around the top of the frame 2. A detailed cross-section of the nozzle 8 is shown in FIG. 4. The nozzle has a continuous annular outlet 9 having a radial width of typically 1.5 mm. Larger radial widths can be engineered if greater water flows are required.

Prior to the burning of its propellant, demilitarization or reverse engineering operations are carried out on a rocket-propelled munition to be disposed of. Firstly, the warhead (which may or may not be explosive) and any ancillary means of propulsion are removed. Having thusly separated the rocket motor from the missile, it is advisable, but not necessary, to remove the rocket motor's venturi mechanism. Such removal creates a less energetic exhaust flow and allows the formation of a denser and more easily contained exhaust cloud. If removal of the venturi mechanism is difficult or dangerous, then the apparatus of the invention can be designed to deal with rocket motors still having a venturi mechanism.

Figure 5:
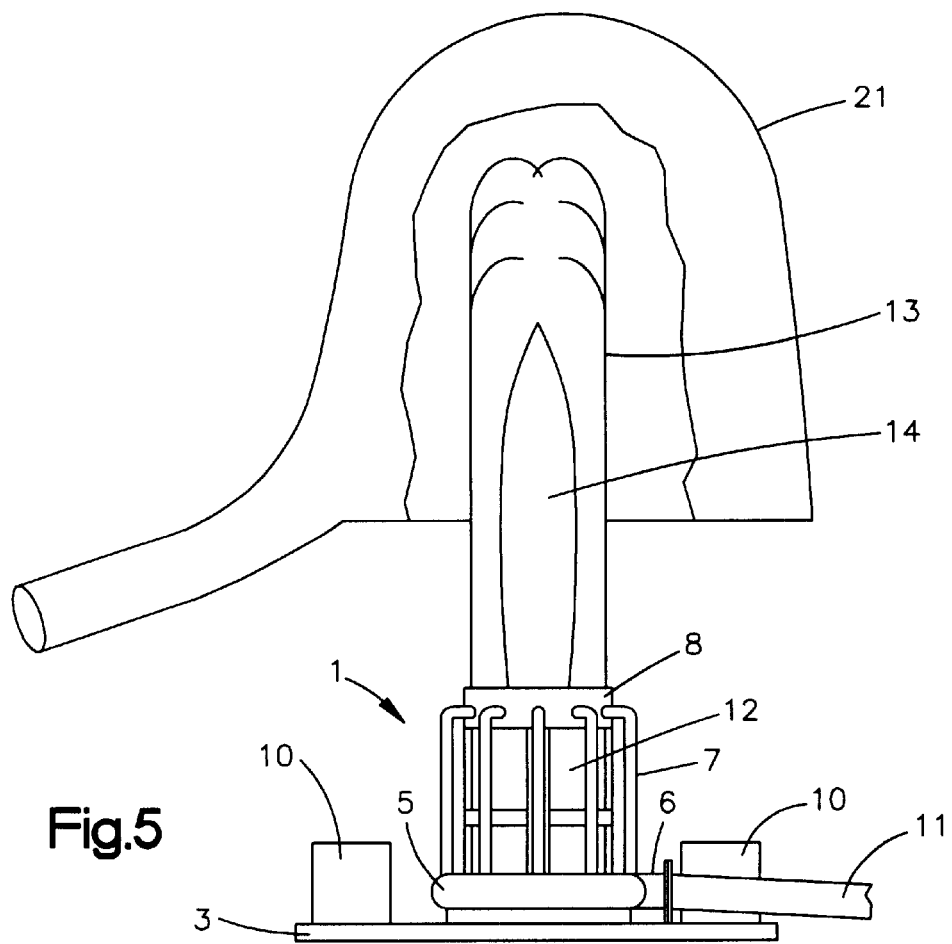
FIG. 5 schematically shows the unit of FIGS. 1 to 4 in use.

As shown in FIG. 5, in use, the unit 1 is weighted down by placing heavy weights 10 on the base 3 of the unit. A high-pressure pipeline 11 is connected to the inlet 6. A rocket motor 12 is then placed in the frame 2 and the clamps 4 are tightened around the rocket motor. Water, optionally containing one or more neutralising chemical or mineral, is then forced through the pipeline 11, into the annular pipe 5, up the vertical pipes 7 and out of the outlet 9 of the annular nozzle 8. In this manner, a cylindrical enclosure 13 of water is formed, completely surrounding the exhaust plume 14 of the rocket motor 12. The water enclosure 13 captures noxious particulate matter exhausted from the burning propellant and thus keeps such matter on the already contaminated land of a purposely built munitions disposal facility and prevents exhaust emissions from entering the atmosphere.

Figure 6:
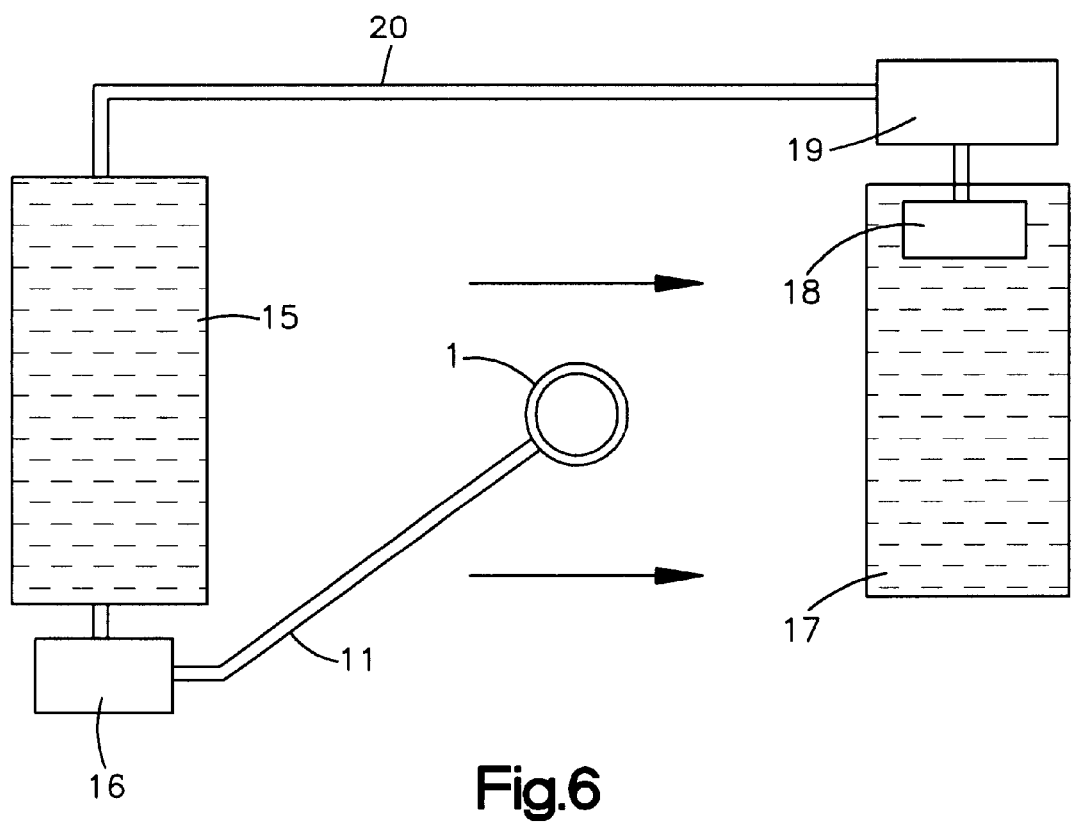
FIG. 6 is a schematic plan of apparatus according jot an embodiment of the invention including the unit of FIGS. 1 to 5.

FIG. 6 is a schematic plan of such a facility. Water is supplied from a supply tank 15, in which pre-mixing of neutralising or decontaminating agents can take place if required, to a high pressure, high volume pump 16. The pump 16 can be driven by a fuel burning engine or by an electric motor, at least one large diesel engine being preferred for field operations.

The pump 16 forces water through the high pressure pipeline 11 to the unit 1. The area of ground on which the unit 1 is situated is provided with either a suitable pavement or a heavy duty membrane and has a slight gradient running downwards in the direction of the arrows. This means that contaminated water from the enclosure flows into a catchment tank 17 where particles suspended in the water are allowed to settle. The catchment apron optionally includes a chalk or lime bed for neutralising acids from the rocket motor exhaust.

A submersible pump 18 is located in the catchment tank 17, spaced from the bottom of the tank so as to prevent sediment in the tank being drawn into the pump 18. The submersible pump is preferably hydraulically driven but may alternatively be electric. The pump 18 transfers the water to a filtration plant 19 and thence back to the supply tank 15 via a low pressure pipeline 20. Filtration beds could alternatively or additionally be included in the catchment tank 17. Preferably, there are two catchment tanks 17 which are used alternately so that the sediment layer can be periodically recovered, treated and disposed of.

While most of the water is recycled as described above, some topping-up of the supply tank 15 will be necessary as a result of evaporation.

The apparatus is portable and can be mounted on a trailer assembly for transportation and field use if the movement of rocket motors would present problems of logistics or safety.

Preliminary calculations which were used to design a nozzle and clamping unit according to the invention are given below:

$$\text{Burn rate} \quad m = \frac{MF}{T} \qquad m = 1.16 \quad \text{kg/sec}$$

Assume that the density of the cold exhaust gases would be $\rho C = 1$ kg/m3
Assume that the exhaust temperature is 3500 K. The volume of gas per second is $$\text{vol} = m \cdot \frac{3500}{300} \cdot \rho C \qquad \text{vol} = 13.55 \quad \text{m3/sec}$$

Guess rocket body diameter DR=0.3 metres

The velocity of the gas is $velG = \frac{\text{vol}}{0.25 \cdot \pi \cdot DR^2} \qquad velG = 191.64 \quad \text{m/sec}$ Rocket thrust $\qquad FT = m \cdot velG \qquad FT = 222.52 \quad \text{Newtons}$ Note that this would be much higher if the gases vent through a Venturi.

The working pressure of the water pump is $\quad P = 8.5 \cdot 10^5 \qquad$ Pascal With efficient nozzles the water velocity $\quad velW = \sqrt{\frac{2 \cdot P}{998}} \qquad velW = 41.27 \quad \text{m/sec}$ Note that is this fast enough to induce cavitation round any sharp bend so we want a gentlle convergence to the nozzle exit.

The area of the water jet nozzle will be $\text{Anozz} = \frac{Q}{velW} \qquad \text{Anozz} = 1.53 \cdot 10^{-3} \quad \text{m2}$ Nozzle gap is $t = \frac{\text{Anozz}}{\pi \cdot kN \cdot DR} \qquad t = 1.47 \cdot 10^{-3} \quad \text{meters}$ A sensible value would be t = 1.5 mm Guess heat of combustion $\quad H = m \cdot 25 \cdot 10^6 \qquad H = 2.9 \cdot 10^7 \quad$ Joules/sec
Latent heat of water $\qquad LH = Q \cdot 1000 \cdot 2.25 \cdot 10^6 \quad LH = 1.42 \cdot 10^8 \quad$ Joules/sec The ratio of latent heat of boiling to heat in rocket exhaust is $\quad \frac{LH}{H} = 4.88$

CONTROL PANEL

| | | | |
|---|---|---|---|
| Rocket diameter | DR = 0.3 | Burn time | T = 180 |
| Nozzle to rocket diam. | kN = 1.1 | Pump pressure | P = 8.5 · 10⁵ |
| Fuel weight | MF = 209 | Pump flow | Q = 0.063 |

Apparatus including a nozzle/clamping unit was constructed according to these criteria and tested against the live open burning of two rocket motors as a control. About 5 tons of water were pumped through the nozzle per minute. The apparatus achieved a dramatic reduction in exhaust emission. Noise was also greatly reduced and this is a further advantage of the invention. After the test, many tons of contaminated water were found to have been deposited downwind of the burning site.

In order to avoid the contaminated water from being carried downwind, a deflecting device in the form of a shroud or hood 21 is provided. (The support for the shroud or hood 21 is omitted). This will catch the contaminated water and direct it to a safe location.

What is claimed is:

1. A method for disposing of a rocket motor having a propellant contained therein and having an exhaust, comprising the steps of:
   burning said propellant and concomitantly annularly spraying an enclosure of liquid completely surrounding the location in which the burning occurs.

2. A method according to claim 1, wherein the rocket motor is secured in a substantially vertical position, with its exhaust end facing generally upwards, during the burning step.

3. A method according to claim 1, comprising further steps of filtering liquid from said enclosure and recycling the filtered liquid.

4. The method according to claim 1 further characterized by deflecting the sprayed liquid to within a shroud or hood.

5. A method according to claim 1, wherein the liquid includes at least one neutralising chemical for neutralising at least some noxious substances resulting from the burning or for capturing hazardous materials, or both.

6. A method according to claim 5 wherein said rocket motor contains a venturi mechanism, and wherein said venturi mechanism is removed prior to the burning step.

7. A method according to claim 5, wherein the rocket motor is clamped in a substantially vertical position, with its exhaust end facing generally upwards, during the burning step.

8. A method according to claim 5, comprising further steps of filtering liquid from said enclosure and recycling the filtered liquid.

9. The method according to claim 5 further characterized by deflecting the sprayed liquid to within a shroud or hood.

10. A method according to claim 1, wherein said rocket motor contains a venturi mechanism, and wherein said venturi mechanism is removed prior to the burning step.

11. A method according to claim 10, wherein the rocket motor is secured in a substantially vertical position, with its exhaust end facing generally upwards, during the burning step.

12. The method according to claim 10 further characterized by deflecting the sprayed liquid to within a shroud or hood.

* * * * *